Figure 1:
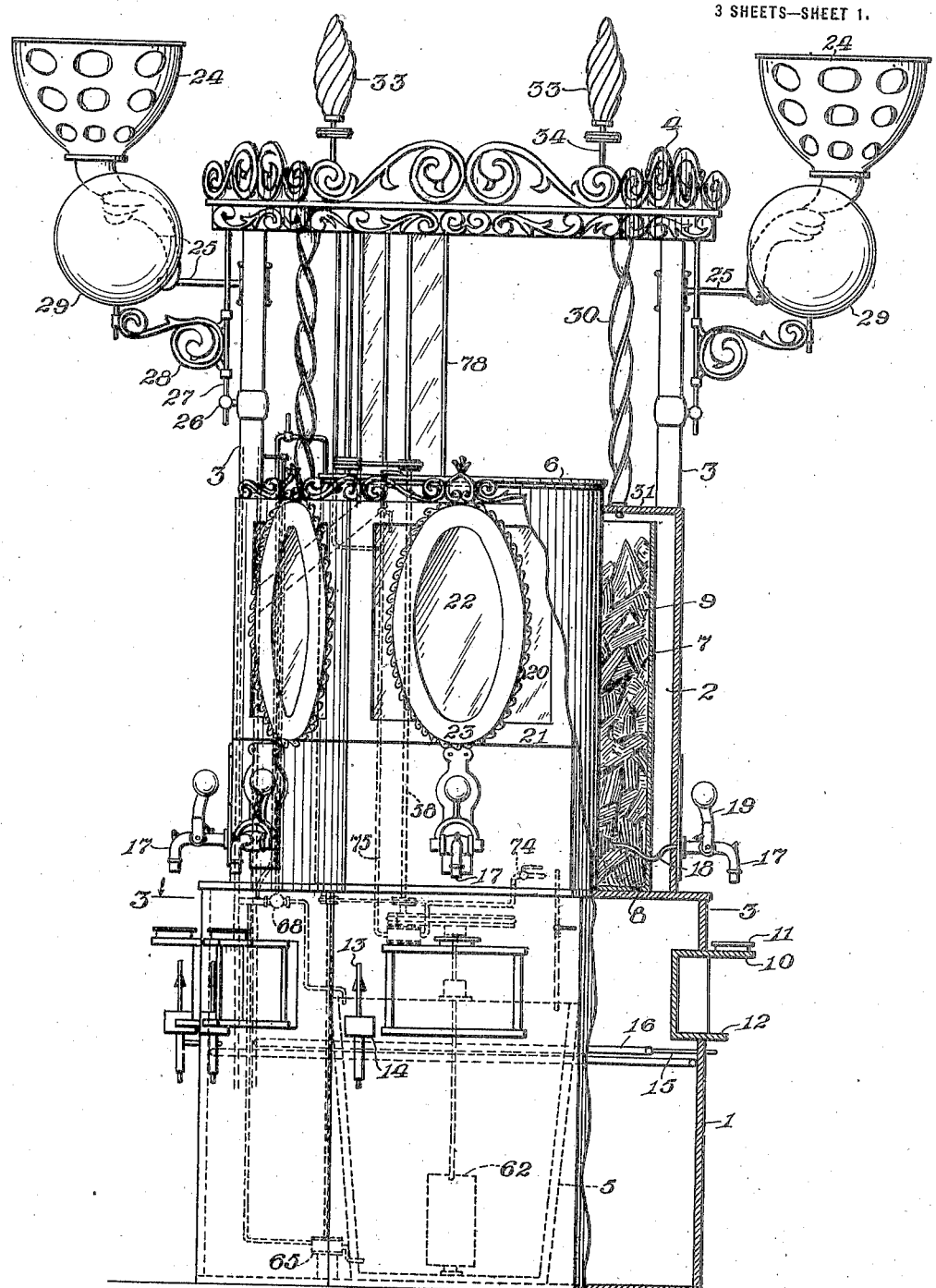

D. J. GORMAN.
MECHANISM FOR EXTRACTING AND DISPENSING FRUIT JUICES.
APPLICATION FILED JUNE 8, 1920.

1,399,474.

Patented Dec. 6, 1921.
3 SHEETS—SHEET 1.

Inventor
Daniel J. Gorman,
By J. Stuart Freeman,
Attorney.

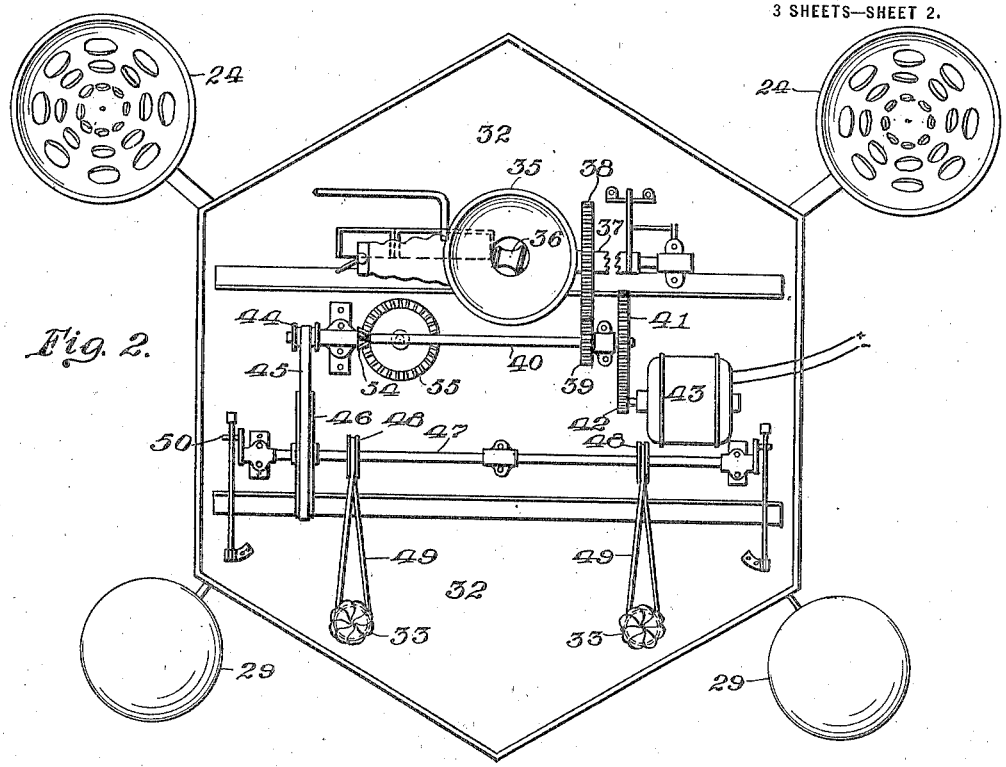
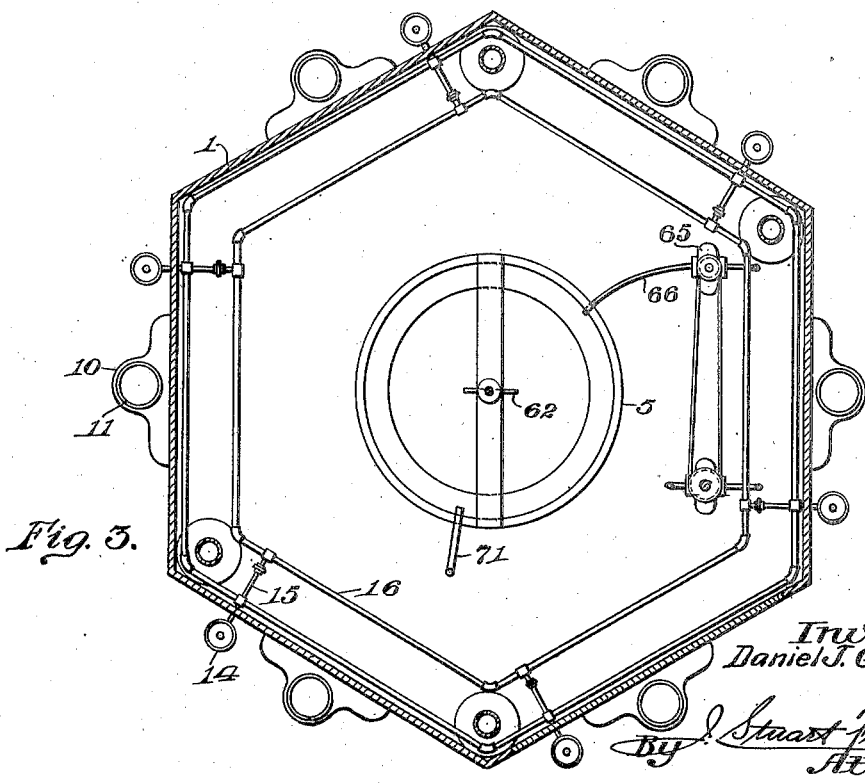

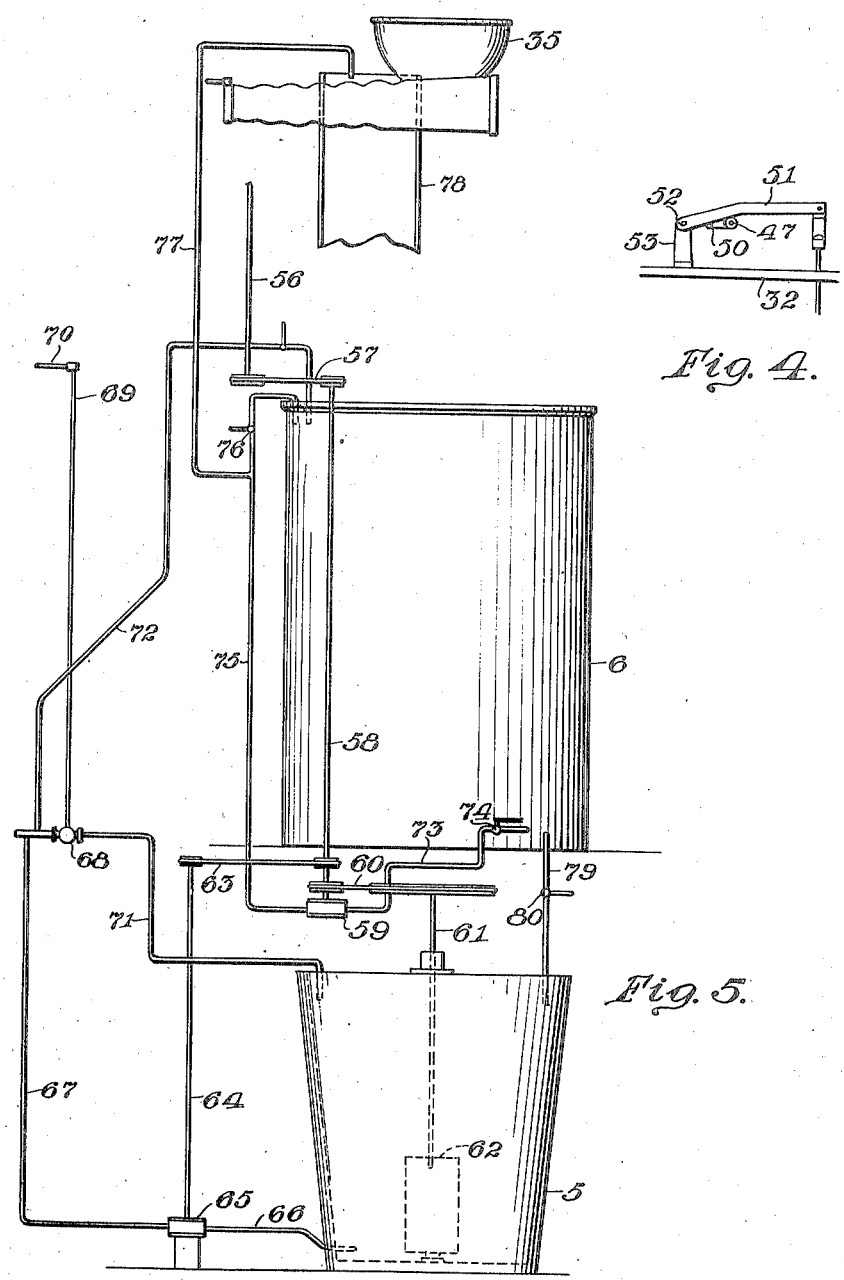

UNITED STATES PATENT OFFICE.

DANIEL J. GORMAN, OF PHILADELPHIA, PENNSYLVANIA, ASSIGNOR TO GORMAN FOUNTAIN AND BEVERAGE MANUFACTURING CORPORATION, A CORPORATION OF DELAWARE.

MECHANISM FOR EXTRACTING AND DISPENSING FRUIT-JUICES.

1,399,474.      Specification of Letters Patent.      Patented Dec. 6, 1921.

Application filed June 8, 1920. Serial No. 387,339.

*To all whom it may concern:*

Be it known that I, DANIEL J. GORMAN, a citizen of the United States, residing at Philadelphia, in the county of Philadelphia and State of Pennsylvania, have invented certain new and useful Improvements in Mechanisms for Extracting and Dispensing Fruit-Juices, of which the following is a specification.

The object of this invention is to provide an improved apparatus for making and dispensing beverages, and particularly those of which fruit juices form the base.

Another object of the invention is to provide an improved mechanism for squeezing the fruit, such as oranges and lemons, in order to obtain therefrom a maximum amount of the juice thereof, and in combination therewith various ornaments and means to animate the same, in order to camouflage the upper portion of the device, to make more attractive the otherwise rather sordid mechanical features of the invention as a whole.

And another very important object of the invention is to provide an improved mechanism and piping system, whereby the fruit juices, water and sweetening material such as sugar are stored, and are brought together as desired in their proper proportions, and thereafter maintained in circulation, to insure a uniform consistency or strength of the beverage being handled; and with the foregoing, to provide partially transparent passageways to convey a portion of the beverage into view of patrons, as an attractive and advertising novelty of the device.

With these and other objects in view, the invention comprises additional details of construction and operation, clearly brought out in the following description, when read in conjunction with the accompanying drawings, in which Figure 1 is a front elevation of the preferred embodiment of the invention, partly in section; Fig. 2 is a top plan view of the same; Fig. 3 is a horizontal section on the line 3—3 of Fig. 1; Fig. 4 is a fragmentary detail view of one of the automaton-operating mechanisms; and Fig. 5 is a diagrammatic view of the storage and circulating system.

Referring particularly to Fig. 1, a hollow base portion is shown as supporting an upper hollow section 2, from which in turn extend upwardly spaced posts 3 carrying an ornamental canopy or grill 4. Within the lowermost portion 1 is positioned a tank 5, in which the ingredients of a beverage are stored preparatory to drawing them out as may be desired for mixing in the proper quantities to form a beverage, dispensed from a tank 6 positioned within the upper portion 2 of the casing and surrounded in spaced relation from its sides by a cylinder 7, closed at the bottom 8, and providing a chamber for containing ice 9 or any other suitable refrigerant, in order to deliver the beverage in a cold state to the consumer.

The bottom portion 1 is preferably provided at spaced regions with a shelf 10 carrying a receptacle 11, adapted to receive a glass or other suitable beverage-containing vessel, while beneath said shelf is a second shelf 12, upon which several of such receptacles may rest until placed in use. Also preferably to one side of each of the spacers of said shelves the lower portion of said casing is provided with receptacle cleansing means, comprising a nozzle 13 and cup 14, said means being of any approved construction wherein the receptacle is inverted and pressed downwardly upon the nozzle 13, thus starting a flow of water therefrom in such manner as to thoroughly cleanse the interior of the receptacle, and from which the waste water falls into the cup 14, and is lead therefrom by means of a pipe 15 to a common water-pipe 16 extending around the inner side of the periphery of the casing.

Supported by the upper section 2 of the casing, and immediately above the tumbler supports 11, is a series of faucets 17, connected by means of a flexible tube 18 to a tank 6, the flow of liquid through said tube and said faucets being controlled by any suitable valve-levers 19. The upper portion of this section of the casing may be provided with various forms of ornamental features, such for instance rectangularly-shaped mirrors 20 surrounded by frames 21, in the same plane with which may be positioned curved or oval mirrors 22 surrounded by similar shaped frames or borders 23.

The uppermost portion of the device as a whole is adapted to support baskets 24, or the like, adapted to contain fresh fruit, the same being supported by means of any suitable brackets 25 carried by the posts 3. In addition thereto, it has been found advantageous from the ornamental standpoint and as an advertising feature to provide one or more of said posts with guides 26, which slidably support rods 27, from which extend outwardly brackets 28 carrying at their free end portions spherical forms 29, which may be colored to represent the fruit carried in the baskets 24, and from which the juice is squeezed for the particular beverage being made and dispensed by the apparatus.

Additionally, there may be provided bars 30, of spiral or other shape, supported at one end in the uppermost wall 31 of the casing section 2, and at their upper ends in the upper positioned platform 32 at an elevation approximately even with the lower portion of the grill 4. These rods may be revolved in order to attract the attention of passers-by, particularly when many lights are permitted to reflect on their polished surfaces. And, likewise, above the platform 32 there are positioned torch-light representations 33, which are also revolubly supported upon shafts 34.

Furthermore, positioned upon the platform 32 is a bowl or hopper 35, into which fresh fruit is placed and which forms the upper portion of a juice-extracting device of any suitable character, and also comprising a spiral conveyer 36, driven upon a shaft 37 by means of a gear 38 meshing with a pinion 39 upon a shaft 40, which, carrying a gear 41, is driven by a pinion 42 carried by the shaft of the motor-operating mechanism 43. The shaft 40 has secured to one portion thereof a belt-pulley 44 connected by a belt 45 to a much larger pulley 46 carried by a shaft 47, which in turn is provided with spaced pulleys 48, which rotate the shafts 34 carrying the torch-like members 33 by means of belts 49.

The end portions of the shaft 47 are provided with cranks having eccentrically positioned pins 50, which, as they revolve, operate to raise and lower a lever 51, pivotally supported at 52 upon a bracket 53 carried by the platform 32, said levers at their opposite ends being attached to the rods 27, which, acting to the motion of the shaft 47, operate to reciprocate in a vertical direction the fruit representations.

The shaft 40 is also provided with a bevel-gear 54, which meshes with the bevel-gear 55 secured to the upper end portion of a shaft 56, which, by means of a belt 57, revolves the shaft 58, which forms the driving-shaft of a circulating-pump 59. The shaft 58, also by means of a belt 60, revolves a shaft 61, which extends downwardly into the storage-tank 5, and carries a paddle or agitator 62 for maintaining the contents of said tank in constant agitation. And again, said shaft 58 is connected by means of a belt 63 with a shaft 64, which forms the driving-shaft for a circulating-pump 65, connecting a pipe 66, leading from the lowermost portion of the tank 5, and a second pipe 67 which leads upwardly and through a valve 68, operated by means of a suitable shaft 69 and handle 70 into a third pipe 71, which leads back into the uppermost portion of said tank.

With this construction, and the valve 68 open, the circulating-pump 65 causes the liquid contents of the tank 5 to circulate from the bottom thereof through the pipes just mentioned and again into the upper portion of the tank, and thereby operates to maintain the volume of liquids within the tank at an even density or consistency, this being particularly aided by the action of the agitator 62. If, however, the valve 68 is closed, either partially or entirely, fruit-juice, after being drawn from the tank 5, passes through the pipe 67 and continues on upwardly by means of a pipe 72 and into the upper portion of the tank 6, in order to replenish the supply of the ingredients in said last-named tank, wherein the desired amount of water is added to the other ingredients to form the particular portion desired before being dispensed as hereinbefore described.

In order to maintain the beverage in the tank 6 at a constant density, a pipe 73 having a valve 74 leads from the bottom part of said tank to the circulating-pump 59, and thence by means of a pipe 75 and valve 76 upwardly into the top portion of said tank. This last-named construction is sufficient to complete the system of piping and associated elements for maintaining the beverage of a given quality, but provision is made for partially closing the valve 76 and permitting the pump 59 to force at least a portion of the mixed beverage through the pipe 75 and a connecting-pipe 77, which extends to the uppermost portion of the apparatus and terminates adjacent to the upper portion of the section of conduit 78, which is preferably relatively wide transversely and thin from front to rear, and having either or both sides formed of glass, in order that the beverage falling by gravity therethrough will be seen by passersby and add to the attractiveness of the device, said transparent conduit section leading directly into the upper portion of the tank 6.

For obvious reasons, it may upon occasion be necessary to partially drain said last-named tank, for which case a pipe 79 tapping the bottom thereof leads by means of a valve 80 into the upper portion of the ingredient-tank 5, whereby, if a mixture has been made in the upper tank which is too weak, a portion of it can be drawn off into the tank 5, and any desired amount of ingredients from said last-named tank added to the remaining portion of the beverage by means of the pipe system of conduits hereinbefore described.

Having thus described my invention, what I desire and claim to protect by Letters Patent of the United States is:—

1. The combination of a storage tank for a beverage, a storage tank for beverage ingredients, a conduit leading from a lower part to an upper part of said latter tank, a circulating pump in said conduit, a conduit leading from said first conduit to said first tank, and a valve in said conduit to direct liquid from said pump into said first tank.

2. The combination of a storage tank for a beverage, a storage tank for beverage ingredients, a conduit leading from a lower part to an upper part of said latter tank, a circulating pump in said conduit, a conduit leading from said first conduit to said first tank, and a valve operative to direct liquid from said second tank, through said pump, and into said first tank.

3. The combination of a tank for a beverage, a conduit leading from a lower part to an upper part of said beverage tank, a circulating pump in said conduit, a transparent conduit section, a second conduit tapping said first conduit and adapted to convey a beverage to a height, whence it flows through said transparent section by gravity only again into said tank, and a valve to direct a portion of the liquid flowing through said pump into said second conduit.

4. The combination of a tank for a beverage, a storage tank for beverage ingredients, a conduit leading from a lower part to an upper part of said beverage tank, a circulation pump in said conduit, a transparent conduit section, a second conduit tapping said first conduit and adapted to convey a beverage to a height, whence it flows through said transparent section by gravity only again into said tank, a valve to direct a portion of the liquid flowing through said pump into said second conduit, a conduit leading from said storage tank to said first-named tank, and a pump in said last-named conduit.

5. The combination of a tank for a beverage, a storage tank for beverage ingredients, a conduit leading from a lower part to an upper part of said beverage tank, a circulating pump in said conduit, a transparent conduit section, a second conduit tapping said first conduit and adapted to convey a beverage to a height, whence it flows through said transparent section by gravity only again into said tank, a valve to direct a portion of the liquid flowing through said pump into said second conduit, a conduit leading from a lower part to an upper part of said storage tank, a circulating pump in said last-named conduit, a pipe connecting said last-named conduit to said beverage tank, and a valve in said last-named conduit to direct liquid from said storage tank into said beverage tank.

In testimony whereof I have affixed my signature.

DANIEL J. GORMAN.